United States Patent
Ottliczky et al.

(10) Patent No.: US 11,566,581 B2
(45) Date of Patent: Jan. 31, 2023

(54) STEEL PISTON WITH OPTIMIZED DESIGN

(71) Applicant: KS Kolbenschmidt GmbH, Neckarsulm (DE)

(72) Inventors: Emmerich Ottliczky, Forchtenberg (DE); Gerhard Luz, Nordheim (DE); Eberhard Weiss, Langenbrettach (DE); Ingo Roth, Pfedelbach (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 16/763,640

(22) PCT Filed: Nov. 14, 2018

(86) PCT No.: PCT/EP2018/081194
§ 371 (c)(1),
(2) Date: May 13, 2020

(87) PCT Pub. No.: WO2019/096827
PCT Pub. Date: May 23, 2019

(65) Prior Publication Data
US 2020/0378336 A1    Dec. 3, 2020

(30) Foreign Application Priority Data
Nov. 14, 2017 (DE) .......................... 102017126688.7

(51) Int. Cl.
*F02F 3/00* (2006.01)
*F02F 3/10* (2006.01)
*F16J 9/20* (2006.01)

(52) U.S. Cl.
CPC ............ *F02F 3/0084* (2013.01); *F02F 3/105* (2013.01); *F16J 9/20* (2013.01)

(58) Field of Classification Search
CPC .. F02F 3/0084; F02F 3/105; F02F 2003/0007; F02F 3/027; F02F 3/22;
(Continued)

(56) References Cited

U.S. PATENT DOCUMENTS 1,473,127 A * 11/1923 Short ...................... F02F 3/027
                                                          92/160
6,155,157 A     12/2000   Jarrett
(Continued)

FOREIGN PATENT DOCUMENTS

CN       101668938 A     3/2010
CN       104160127 A    11/2014
(Continued)

*Primary Examiner* — Jacob M Amick
*Assistant Examiner* — Charles J Brauch
(74) *Attorney, Agent, or Firm* — Young Basile Hanlon & MacFarlane, P.C.

(57) ABSTRACT

A steel piston (1) for a combustion engine, having an upper part in which a ring section (7) with at least one ring groove (8) is arranged, wherein the upper part is adjoined by a lower part that has two opposing skirt wall sections (2), wherein the two skirt wall sections (2) are connected via two mutually opposite case walls (3), wherein a pin bore (4) surrounded by a piston boss (6) is provided in each case wall (3). In one example, there is at least one aperture (14) or at least one recess in the case wall (3) in the region between the piston boss (6) and the skirt wall section (2).

12 Claims, 1 Drawing Sheet

(58) Field of Classification Search
CPC .. F02F 2200/04; F02F 3/02; F16J 9/20; B23P 15/10
See application file for complete search history.

(56) References Cited

U.S. PATENT DOCUMENTS

| | | | |
|---|---|---|---|
| 6,260,472 | B1 | 7/2001 | Zhu et al. |
| 8,387,585 | B2 | 3/2013 | Blau et al. |
| 8,485,088 | B2 | 7/2013 | Feeser |
| 8,925,511 | B2 | 1/2015 | Allig et al. |
| 2002/0046593 | A1* | 4/2002 | Ribeiro ............... B23P 15/10 72/377 |
| 2003/0221553 | A1 | 12/2003 | Glinsner et al. |
| 2008/0264247 | A1 | 10/2008 | Buschbeck et al. |
| 2008/0264376 | A1* | 10/2008 | Braig ................. F02F 3/027 123/193.6 |
| 2013/0233270 | A1* | 9/2013 | Brandt ................. F02F 3/00 123/193.6 |
| 2014/0238332 | A1 | 8/2014 | Laqua et al. |
| 2015/0027401 | A1 | 1/2015 | Gniesmer |
| 2016/0123274 | A1 | 5/2016 | Miller et al. |
| 2017/0051702 | A1 | 2/2017 | Kuhnel et al. |
| 2017/0051703 | A1 | 2/2017 | Lormes et al. |
| 2018/0252182 | A1 | 9/2018 | Stier |
| 2018/0274480 | A1 | 9/2018 | Lormes |
| 2018/0306139 | A1 | 10/2018 | Lormes |
| 2018/0313293 | A1 | 11/2018 | Laqua |
| 2019/0136793 | A1 | 5/2019 | Kuhnel et al. |
| 2019/0178202 | A1 | 6/2019 | Muller |
| 2020/0072158 | A1 | 3/2020 | Muller et al. |

FOREIGN PATENT DOCUMENTS

| | | |
|---|---|---|
| DE | 19935410 A1 | 2/2001 |
| DE | 102011115048 A1 | 4/2013 |
| DE | 102016201628 A1 | 8/2017 |
| JP | S63130238 A | 6/1988 |
| WO | 2006/014741 A2 | 2/2006 |
| WO | 2011/056822 A2 | 5/2011 |
| WO | 2013050020 A1 | 4/2013 |
| WO | 2013/097839 A2 | 7/2013 |

* cited by examiner

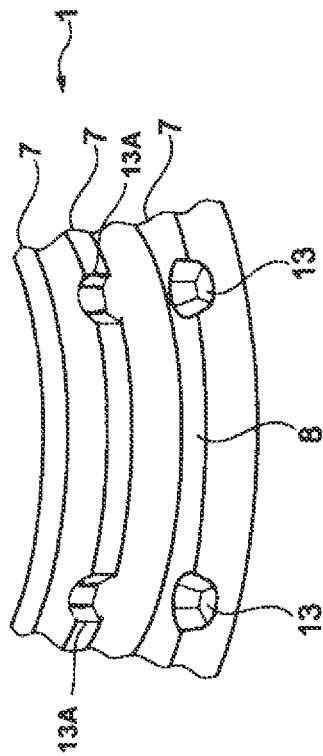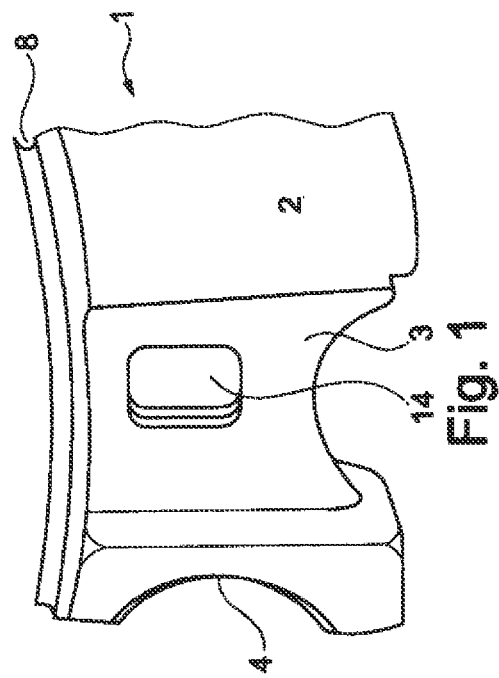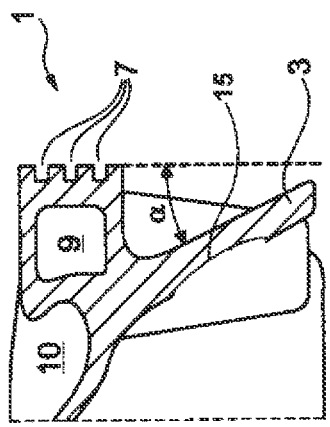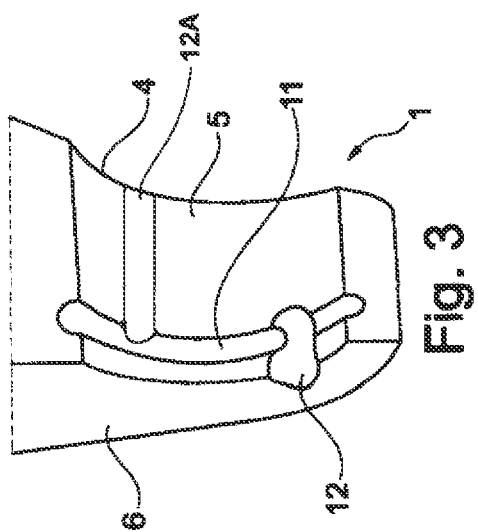

STEEL PISTON WITH OPTIMIZED DESIGN

CROSS-REFERENCE TO RELATED APPLICATIONS

This application is filed pursuant to 35 USC 371 and claims priority benefit to PTC application PCT/EP2018/081194 filed Nov. 14, 2018 which claims priority benefit to German patent application 102017126688.7 filed Nov. 14, 2017, the entire contents of both applications are incorporated herein by reference.

TECHNICAL FIELD

The invention relates to a steel piston for a combustion engine, having an upper part in which a ring section is arranged with at least one ring groove, wherein the upper part is adjoined by a lower part that has two opposite skirt wall sections, wherein the two skirt wall sections are connected via two oppositely arranged case walls, wherein there is a pin bore surrounded by a piston boss in each case wall, and a method for the manufacture of such a steel piston.

BACKGROUND

Pistons made of a steel material with the aforementioned characteristics (so-called box design) are generally known. They are used in combustion engines for high performance requirements in order to be able to withstand the parameters to meet the performance requirements, in particular combustion temperature and combustion pressure. However, the steel material in such pistons has the disadvantage of a high weight, which in turn has an increasing effect on fuel consumption in particular.

From the prior art for steel pistons, in particular forged steel pistons, it is known that the piston has an approximately straight course in the case wall and window area (piston boss) in the direction of the piston longitudinal axis (also referred to as the piston stroke axis) with small production-related demolding obliques.

SUMMARY

The invention is based on the object to optimize a steel piston with respect to its function and/or in weight by special design features.

According to the invention, it is provided that at least one aperture or at least one recess is arranged in a region around the pin bore. In a top view of the pin bore from the outside, the at least one recess or the at least one aperture is provided for example on the right and/or left of and/or above and/or below the pin bore, but can also be provided in intermediate areas. In particular, in one embodiment of the invention there is at least one aperture or at least one recess in the case wall in the region between the piston boss and the skirt wall section. The at least one aperture around the pin bore, in particular in at least one case wall, causes a significant weight reduction in such a region of the steel piston in which such an aperture can be placed without damaging the strength of the steel piston during its operation in the cylinder of the combustion engine. For example, the shape of the aperture can be round (preferably made by drilling), square (preferably made by milling), rectangular (again preferably produced by milling), oval (also preferably made by milling) or another suitable geometric shape. The at least one aperture can be introduced subsequently after the production of a piston blank (casting or preferably forging) of the steel piston. Alternatively (and preferably) it is conceivable to already introduce at least one aperture with production of the piston blank, which is produced by means of a material-displacing process (such as in particular a forging process). The optimal size, i.e., the area of the aperture in the case wall, can be determined depending on the design, i.e. the construction of the piston, either by tests or especially preferably by known and established finite-element methods. The same applies to the arrangement of a recess around the pin bore, in particular in the case wall, which may be provided only on the outward facing case wall (in the direction of a cylinder wall of the combustion engine), only on the inward facing case wall (in the direction of the central piston stroke axis) or on both sides of the case wall. By means of such a recess, material is also removed or displaced in the forging process at such points of the steel piston which do not lead to an impairment of its strength, wherein weight can be saved by the material removal at the same time. However, the arrangement of at least one aperture in a case wall is preferred, since significantly more material can be saved and weight can be reduced in this way compared to a recess.

In a further development of the invention it is provided that there is an aperture or a recess in each case wall. Thus, the steel piston can be designed symmetrically, for which purpose each aperture or recess in each case wall is preferably designed in a similar way, i.e. with respect to its area and shape.

The aforementioned at least one aperture and the at least one recess can also be combined with each other. For example, an aperture to the right and left of the pin bore and a recess above the pin bore can be provided (considered in a top view of pin bore from the outside in each case).

In one development of the invention it is provided that the case wall is arranged inclined by an angle α (alpha) relative to a piston stroke axis (vertical axis). Thus, the piston blank, based on which the finished steel piston is produced, can be produced very well in a forging process with suitable tool selection and machining direction in order to achieve a solid structure and a resulting structural optimization for the finished ready-to-use and highly loaded piston produced from this piston blank. The inclined case walls can also advantageously reduce friction, noise generation, oil consumption and blow-by effects.

In one development of the invention, it is provided that an excavation groove is arranged in a pin surface of the pin bore, in particular an excavation groove not lying on the piston longitudinal axis. In the excavation groove, a retaining ring for the piston pin can be arranged in a known manner. Moreover, this excavation groove causes material removal which further reduces the weight of the steel piston. In addition, it is provided that at least one recess extends from the excavation groove towards at least one end of the pin bore. Weight is also reduced by this at least one recess in places of the steel piston in which no weakening of the steel piston occurs due to the removal of the material. The excavation groove can also be introduced after the production of the piston blank (again by casting, forging or the like). In a preferred manner, however, it is already introduced by means of the material-displacing process (such as forging) and only subsequently made to measure by processing (such as by means of a machining process).

In one development of the invention it is provided that at least one recess extends from the at least one ring groove upwards and/or downwards with respect to the piston stroke axis in the upper part of the steel piston. With such a recess, not only is material saved and thus the weight of the steel piston is reduced, but also oil can be dissipated from the ring groove, in which there is an oil ring or even no oil ring.

One of the elements described above or a combination of or all of the elements of the steel piston described above, such as the at least one recess and/or the at least one aperture and/or the inclined case walls and/or the excavation groove in the pin bore and/or the recess extending from the excavation groove towards at least one end of the pin bore and/or the recess extending upwards and/or downwards in relation to the piston from the at least one ring groove in the upper part of the steel piston, is already implemented with the production of the piston blank by means of a material-displacing process (such as a forging process) and is subsequently reworked if necessary at any time. This reworking is carried out in a known manner by means of a machining process (such as a milling process).

A steel piston with some the characteristics described above, but also with all the characteristics described above, is summarized again below:

- The steel piston has recessed or inwardly or outwardly inclined features on its outer shape, in particular on the case walls and the window areas, which deviate from the main contour along the piston longitudinal axis, such as case walls inwardly or outwardly inclined upwards from below,
- recesses located in the area of the oil ring groove and used for oil drainage,
- recesses located in the outer region of the pin bore and used as an excavation groove for the retaining ring,
- recesses located in the case surface or protruding diagonally inwards from the case surface behind the ring section and used to reduce weight,
- recesses located in the case wall and/or apertures through the case wall, which are used to reduce weight.

By the features according to the invention mentioned above, the function of the steel piston is improved, such as the oil consumption, the noise behavior or the ease of assembly. In addition, the weight of the steel piston can be significantly reduced compared to known conventional versions. Moreover, due to the features according to the invention, when the steel piston is used in the cylinder of the combustion engine an improved function in this combustion engine results and it contributes to a reduction of emissions and fuel consumption.

BRIEF DESCRIPTION OF THE DRAWINGS

An exemplary embodiment of the steel piston according to the invention is explained below on the basis of FIGS. 1 through 4.

FIG. 1 is a perspective view of a portion of one example of the invention.

FIG. 2 is a cross-section of a portion of one example of the invention.

FIG. 3 is a perspective view of a portion of one example of the invention.

FIG. 4 is a perspective view of a portion of one example of the invention.

DETAILED DESCRIPTION

In FIG. 1, a part of a steel piston 1 is shown, which has a skirt wall section 2 (and an opposing further skirt wall section that is not shown). The two opposing skirt wall sections 2 are connected to each other by respective case wall 3, wherein the two opposing case walls 3 (in FIG. 1 only one case wall 3 is shown) are set back relative to the outer diameter of the steel piston 1, on which the outer surface of the skirt wall sections 2 is located. A pin bore 4 is indicated in FIG. 1 opposite the end of the skirt wall section 2 lying parallel to the piston stroke axis and from which the case wall 3 extends.

FIG. 2 shows the steel piston 1 in a partial sectional representation, whereas FIGS. 3 and 4 show further detailed views (again in part) of the steel piston 1.

In these FIGS. 2 to 4, it is shown that the case wall 3 connecting the skirt wall sections 2 is arranged inclined by an angle α (alpha) relative to the piston stroke axis (shown dashed). The reference number 5 denotes an inward-facing pin surface of the pin bore 4. Reference number 6 denotes a piston boss arranged around the pin bore 4. The piston boss 6 can transition directly into a case wall 3 without a step down, a curvature in the transition or the like. However, it is also conceivable that there is a stepped or curved transition in the transition from the piston boss 6 to the adjacent case wall 3. A ring section 7 in the upper part of the steel piston 1 has at least one ring groove 8. In this exemplary embodiment, the ring section 7 has a total of three ring grooves 8 one above the other in the upper part of the steel piston 1. The rings are not shown.

The steel piston 1 of the exemplary embodiment further has an annular cooling channel 9 and a combustion chamber trough 10 lying concentrically within the cooling channel 9. These two elements can be present individually or together, wherein however it may be that only the cooling channel 9 or only the combustion chamber trough 10 is present. The reference number 11 denotes an excavation groove 11 lying in the pin surface 5, in which a securing ring for the piston pin, which is not shown, is inserted when the piston pin is inserted in the pin bore 4. A single recess 12 extends outwards from the excavation groove 11 in this exemplary embodiment, that is towards the piston boss 6, wherein however more than a single recess 12 can be provided. The at least one recess 12 can also be directed inwards (e.g., 12A FIG. 3).

Reference number 13 denotes at least one further recess, which extends downwards from a ring groove 8 (the lower ring groove 8 is shown in FIG. 4) in the upper part of the steel piston 1 when looking at FIG. 4. Of course, it is also conceivable to also provide at least one recess 13 in the region of the other ring grooves 8. Likewise, the at least one recess 13 may extend not only downwards (13 in FIG. 4), but only upwards (13A FIG. 4), or even downwards and upwards (e.g., 13 and 13A in FIG. 4).

As another feature according to the invention, another aperture 14 is shown in the case wall 3 in FIG. 1. This aperture 14 may be the only aperture in this case wall 3, wherein it is also conceivable to provide more than the one aperture 14 shown in the case wall 3. The same applies to the provision of at least one aperture 14 not only in the one case wall 3 shown, but also in at least one further case wall 3, preferably in all four case walls 3 that are present. As an alternative or complementary to the at least one aperture 14 shown, at least one recess 15 can also be provided in the case wall (on the outward-facing side and/or the inward-facing side (FIG. 2) of the case wall 3.

REFERENCE CHARACTER LIST 1. steel piston
2. skirt wall section
3. case wall
4. pin bore
5. pin surface 6. piston boss
7. ring section
8. ring groove
9. cooling duct
10. combustion chamber trough
11. excavation groove
12. recess
12A. recess
13. recess
13A. recess
14. aperture
15. recess

What is claimed is:

1. A steel piston for use in a combustion engine comprising:
an upper part in which a ring section includes at least one ring groove;
a lower part connected to the upper part, the lower part having two opposite skirt wall sections; and
two mutually opposite case walls connecting the two skirt wall sections, each case wall defining a pin bore surrounded by a piston boss and further defining at least one recess in an inward surface of the case wall facing a piston stroke axis and positioned between the piston boss and the respective skirt wall section, each case wall further defining a first through aperture and a second through aperture positioned on opposing sides of the piston boss, each of the first through aperture and the second through aperture positioned between the piston boss and the respective skirt wall section.

2. The steel piston of claim 1, wherein each case wall is positioned inclined by an angle alpha relative to the piston stroke axis.

3. The steel piston of claim 1, wherein an excavation groove is defined in a pin surface of the pin bore in at least one of the two case walls.

4. The steel piston of claim 3, wherein a recess extends from the excavation groove towards at least one end of the pin bore.

5. The steel piston of claim 1, wherein the at least one ring groove comprises an upper ring groove and a lower ring groove positioned vertically lower than the upper ring groove relative to the piston stroke axis, wherein at least one recess extends upwards from the lower ring groove to the upper ring groove thereby placing the lower ring groove in communication with the upper ring groove.

6. A method for producing a steel piston for a combustion engine, the piston having an upper part having a ring section including at least one ring groove, a lower part connected to the upper part and having two opposite skirt wall sections, and two mutually opposing case walls connecting the skirt wall sections, each case wall having a piston boss defining a pin bore, the method comprising:
implementing through a material displacement process in a piston blank for the steel piston the two case walls each defining a recess positioned in an inward surface of the case wall facing a piston stroke axis and positioned between the piston boss and the respective skirt wall section.

7. The method of claim 6 further comprising reworking the piston blank by a machining process.

8. The method of claim 6 wherein the implementing through the material displacement process in the piston blank for the steel piston further comprises:
an excavation groove positioned in a pin surface of the respective pin bore: and
a recess extending from the excavation groove inward toward the piston stroke axis to an inward end surface of the piston boss.

9. The steel piston of claim 4, wherein the recess extending from the excavation groove extends inward toward the piston stroke axis to an inward end surface of the piston boss.

10. The steel piston of claim 5 wherein at least one recess extends downwards relative to the piston stroke axis from the at least one ring groove in the upper part of the steel piston.

11. The method of claim 6 wherein the at least one ring groove comprises an upper ring groove and a lower ring groove positioned vertically lower than the upper ring groove relative to the piston stroke axis, the implementing through the material displacement process in the piston blank for the steel piston further comprises at least one recess extending upwards from the lower ring groove to the upper ring groove thereby placing the lower ring groove in communication with the upper ring groove.

12. The method of claim 6 wherein implementing through the material displacement process in the piston blank for the steel piston further comprises a first through aperture and a second through aperture positioned on opposing sides of the piston boss, each of the first through aperture and the second through aperture positioned between the piston boss and the respective skirt wall section.

* * * * *